(12) United States Patent
Sung et al.

(10) Patent No.: US 12,479,990 B2
(45) Date of Patent: Nov. 25, 2025

(54) THERMOPLASTIC RESIN COMPOSITION AND EXTERIOR MATERIAL INCLUDING THE SAME

(71) Applicant: LG CHEM, LTD., Seoul (KR)

(72) Inventors: Daeun Sung, Daejeon (KR); Tae Hoon Kim, Daejeon (KR); Chun Ho Park, Daejeon (KR); Yong Hee An, Daejeon (KR); Wangrae Joe, Daejeon (KR); Ho Hoon Kim, Daejeon (KR); Jeongmin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 327 days.

(21) Appl. No.: 17/768,656

(22) PCT Filed: Dec. 11, 2020

(86) PCT No.: PCT/KR2020/018191
§ 371 (c)(1),
(2) Date: Apr. 13, 2022

(87) PCT Pub. No.: WO2022/019407
PCT Pub. Date: Jan. 27, 2022

(65) Prior Publication Data
US 2024/0110049 A1    Apr. 4, 2024

(30) Foreign Application Priority Data
Jul. 23, 2020    (KR) .......................... 10-2020-0091648

(51) Int. Cl.
*C08L 25/04*    (2006.01)
*C08K 3/013*    (2018.01)
*C08L 25/12*    (2006.01)

(52) U.S. Cl.
CPC .............. *C08L 25/12* (2013.01); *C08K 3/013* (2018.01); *C08L 25/04* (2013.01); *C08L 2205/025* (2013.01); *C08L 2205/035* (2013.01)

(58) Field of Classification Search
CPC ...... C08L 25/12; C08L 2205/03; C08L 51/04; C08L 25/06; C08L 77/00
(Continued)

(56) References Cited

U.S. PATENT DOCUMENTS 4,774,287 A * 9/1988 Shimozato .............. C08L 25/16
525/70
5,837,772 A 11/1998 Mc Kee et al.
(Continued)

FOREIGN PATENT DOCUMENTS

CN    101787205 A    7/2010
CN    102010591 A    4/2011
(Continued)

OTHER PUBLICATIONS

International Search Report and Written Opinion issued in corresponding International Patent Application No. PCT/KR2020/018191, dated Apr. 16, 2021.
(Continued)

*Primary Examiner* — Heidi R Kelley
(74) *Attorney, Agent, or Firm* — Morgan, Lewis & Bockius LLP (57) ABSTRACT

The present disclosure relates to a thermoplastic resin composition and an exterior material including the same. The thermoplastic resin composition included 90 to 99.5% by weight of styrene-based resins each including 5 to 30% by weight of acrylate rubber having a DLS average particle diameter of 0.25 to 0.32 μm or a TEM average particle diameter of 0.2 to 0.27 μm based on a total weight of the styrene-based resins; and 0.5 to 10% by weight of a poly-
(Continued)

amide resin, and an exterior material including the thermoplastic resin composition. According to the present disclosure, a low-gloss thermoplastic resin composition having excellent aesthetics, such as softness, luxuriousness, and naturalness, due to uniformity, low gloss, and improvement in surface texture while having mechanical properties and processability equal or superior to those of conventional ASA resins; and an exterior material including the low-gloss thermoplastic resin composition may be provided.

13 Claims, 1 Drawing Sheet

(58) Field of Classification Search
USPC .......................................................... 525/70
See application file for complete search history.

(56) References Cited

U.S. PATENT DOCUMENTS

| | | |
|---|---|---|
| 6,696,165 B1 | 2/2004 | Bennet et al. |
| 2006/0094822 A1 | 5/2006 | Gaggar et al. |
| 2014/0147660 A1 | 5/2014 | Miyahiro et al. |
| 2016/0032093 A1 | 2/2016 | Abbound et al. |
| 2017/0369692 A1 | 12/2017 | Park et al. |
| 2018/0037730 A1 | 2/2018 | Lee et al. |
| 2019/0382574 A1 | 12/2019 | An et al. |
| 2021/0054193 A1 | 2/2021 | Kim et al. |

FOREIGN PATENT DOCUMENTS

| | | | |
|---|---|---|---|
| CN | 108003548 A | 5/2018 | |
| JP | S54112954 A | 9/1979 | |
| JP | H08311353 A | 11/1996 | |
| JP | 2002-284823 A | 10/2002 | |
| JP | 2004352841 A | 12/2004 | |
| JP | 2005248138 A | 9/2005 | |
| KR | 10-2009-0095764 A | 9/2009 | |
| KR | 1020130156579 | * 12/2013 | .............. C08L 51/06 |
| KR | 10-2015-0069888 A | 6/2015 | |
| KR | 10-2015-0072095 A | 6/2015 | |
| KR | 10-1534962 B1 | 7/2015 | |
| KR | 10-2017-0066103 A | 6/2017 | |
| KR | 10-2018-0050596 A | 5/2018 | |
| KR | 10-1958884 B1 | 3/2019 | |
| KR | 10-2019-0043404 A | 4/2019 | |
| KR | 10-1974164 B1 | 4/2019 | |
| KR | 10-2019-0073323 A | 6/2019 | |
| WO | 2018/084558 A2 | 5/2018 | |

OTHER PUBLICATIONS

Extended European Search Report issued in EP 20 945 871.0, dated Nov. 18, 2022.

First Office Action issued in corresponding Japanese Patent Application No. 2022-525078, dated May 29, 2023. Note: KR 10-1534962 cited therein was listed in an earlier-filed SB08.

First Office Action issued in corresponding Korean Patent Application No. 10-2020-0091648, dated Jun. 27, 2023. Note: KR 10-2015-0069888 cited therein was listed in an earlier-filed SB08.

Office Action issued Nov. 17, 2023 for corresponding Chinese Patent Application No. 202080069401.6 Citation: KR 2015-0069888 A and KR 2019-0073323 A are of record.

* cited by examiner

THERMOPLASTIC RESIN COMPOSITION AND EXTERIOR MATERIAL INCLUDING THE SAME

CROSS-REFERENCE TO RELATED APPLICATION

This application claims priority to Korean Patent Application No. 10-2020-0091648, filed on Jul. 23, 2020 in the Korean Intellectual Property Office, the disclosure of which is incorporated herein by reference.

TECHNICAL FIELD

The present invention relates to a thermoplastic resin composition and an exterior material including the same. More particularly, the present invention relates to a low-gloss thermoplastic resin composition having excellent aesthetics due to low gloss and improvement in surface texture while having mechanical properties and processability equal or superior to those of conventional ASA-based resins; and an exterior material including the low-gloss thermoplastic resin composition.

BACKGROUND ART

Acrylate compound-styrene-acrylonitrile copolymers (hereinafter referred to as "ASA resins") have weather resistance, aging resistance, chemical resistance, rigidity, impact resistance, and processability, and have been widely used in various fields such as automobiles, miscellaneous goods, and construction materials.

In the case of ASA resins used in exterior materials, there is increasing need for development of a low-gloss ASA resin that can satisfy aesthetic demands without the artificial feeling of plastics.

Conventionally, crystalline resins such as nylon have been used as low-gloss ASA resins. However, the crystalline resins have limitations in improving surface texture and aesthetics.

RELATED ART DOCUMENTS

Patent Documents

KR 2009-0095764 A

DISCLOSURE

Technical Problem

Therefore, the present invention has been made in view of the above problems, and it is one object of the present invention to provide a low-gloss thermoplastic resin composition having excellent aesthetics, such as softness, luxuriousness, and naturalness, due to uniformity, low gloss, and improvement in surface texture while having mechanical properties and processability equal or superior to those of conventional ASA resins; and an exterior material including the low-gloss thermoplastic resin composition.

The above and other objects can be accomplished by the present invention described below.

Technical Solution

In accordance with one aspect of the present invention, provided is a thermoplastic resin composition comprising 90 to 99.5% by weight of a styrene-based resin including 5 to 30% by weight of acrylate rubber having a DLS average particle diameter of 0.25 to 0.32 μm or a TEM average particle diameter of 0.2 to 0.27 μm based on a total weight of the styrene-based resin; and 0.5 to 10% by weight of a polyamide resin.

In addition, the present invention may provide a thermoplastic resin composition comprising 90 to 99.5% by weight of a styrene-based resin comprising 5 to 30% by weight of acrylate rubber based on a total weight of the styrene-based resins; and 0.5 to 10% by weight of a polyamide resin, wherein the thermoplastic resin composition has a reduced volume of 15 to 40 as calculated using Equation 1 below:

$$\text{Reduced volume} = [1/6\Pi(R_A)^3(A/A+B+C) + 1/6\Pi(R_B)^3(B/A+B+C) + 1/6\Pi(R_C)^3(C/A+B+C)]/[1/6(R_C)^3] \quad \text{[Equation 1]}$$

wherein $R_A$ represents an average particle diameter (nm) of a rubber having a largest average particle diameter among rubbers comprised in the resin composition, $R_B$ represents an average particle diameter (nm) of a rubber having a medium average particle diameter among rubbers included in the resin composition, $R_C$ represents an average particle diameter (nm) of a rubber having a smallest average particle diameter among rubbers comprised in the resin composition, A represents a content (% by weight) of a graft polymer having the rubber with the largest average particle diameter among rubbers comprised in the resin composition, B represents a content (% by weight) of a graft polymer having the rubber with the medium average particle diameter among rubbers included in the resin composition, and C represents a content (% by weight) of a graft polymer having the rubber with the smallest average particle diameter among rubbers included in the resin composition.

When rubber having the medium average particle diameter is not included in the resin composition of the present invention, B is "0".

For reference, volume may be defined by Equation 2 below.

$$\text{Volume} = 4/3\Pi r^3 = 1/6\Pi R^3 \quad \text{[Equation 2]}$$

wherein r represents radius, and R represents diameter.

The styrene-based resin may preferably comprise two or more selected from the group consisting of a first styrene-based resin, a second styrene-based resin, and a third styrene-based resin, wherein the first styrene-based resin is preferably an acrylate-aromatic vinyl compound-vinyl cyanide compound graft copolymer including 30 to 50% by weight of acrylate rubber having an average particle diameter 0.25 to 0.32 μm or a TEM average particle diameter of 0.2 to 0.27 μm, the second styrene-based resin is preferably an aromatic vinyl compound-vinyl cyanide compound copolymer, and the third styrene-based resin preferably comprises one or more selected from the group consisting of i) an acrylate-aromatic vinyl compound-vinyl cyanide compound graft copolymer including 45 to 65% by weight of acrylate rubber having a DLS average particle diameter of 0.05 to 0.2 μm or a TEM average particle diameter of 0.04 to 0.14 μm, ii) an acrylate-aromatic vinyl compound-vinyl cyanide compound graft copolymer including 45 to 65% by weight of acrylate rubber having a DLS average particle diameter of 0.33 to 0.5 μm or a TEM average particle diameter of 0.28 to 0.45 μm, iii) a heat resistant styrene-based resin, and iv) an aromatic vinyl compound-vinyl cyanide compound-methacrylate copolymer.

The styrene-based resin may preferably include 20 to 50% by weight of the first styrene-based resin, 10 to 60% by weight of the second styrene-based resin, and 1 to 30% by weight of the third styrene-based resin based on a total weight of the thermoplastic resin composition.

The thermoplastic resin composition may preferably have a reduced volume of 15 to 40.

For example, the thermoplastic resin composition may include 0.1 to 5 parts by weight of an inorganic pigment based on 100 parts by weight in total of the thermoplastic resin composition.

The thermoplastic resin composition may preferably have an average surface roughness (Ra) of 2.2 or less as measured at 5 points using an optical profiler system.

The thermoplastic resin composition may preferably have a matte thermoplastic resin composition having a film gloss of 15 or less as measured at 60°.

The first styrene-based resin may be preferably an acrylate-aromatic vinyl compound-vinyl cyanide compound graft copolymer including 30 to 50% by weight of acrylate rubber having a DLS average particle diameter of 0.25 to 0.32 μm or a TEM average particle diameter of 0.2 to 0.27 μm, 40 to 60% by weight of an aromatic vinyl compound, and 8 to 18% by weight of a vinyl cyanide compound.

The second styrene-based resin may be preferably an aromatic vinyl compound-vinyl cyanide compound copolymer including 65 to 80% by weight of an aromatic vinyl compound and 20 to 35% by weight of a vinyl cyanide compound.

Based on a total weight of the thermoplastic resin composition, the second styrene-based resin may preferably comprise a) 10 to 60% by weight of an aromatic vinyl compound-vinyl cyanide compound copolymer having a weight average molecular weight of 90,000 to 160,000 g/mol and b) 0 to 40% by weight of an aromatic vinyl compound-vinyl cyanide compound copolymer having a weight average molecular weight of greater than 160,000 g/mol and less than or equal to 200,000 g/mol. In this case, mechanical properties and processability may be maintained, and due to uniformity, low gloss, and improvement in surface texture, aesthetics such as softness, luxuriousness, and naturalness may be excellent.

The acrylate-aromatic vinyl compound-vinyl cyanide compound graft copolymer (i) may preferably comprise 45 to 65% by weight of acrylate rubber having a DLS average particle diameter of 0.05 to 0.2 μm or a TEM average particle diameter of 0.04 to 0.14 μm, 25 to 45% by weight of an aromatic vinyl compound, and 8 to 18% by weight of a vinyl cyanide compound; the acrylate-aromatic vinyl compound-vinyl cyanide compound graft copolymer (ii) may preferably comprise 40 to 60% by weight of acrylate rubber having a DLS average particle diameter of 0.33 to 0.5 μm or a TEM average particle diameter of 0.28 to 0.45 μm, 25 to 45% by weight of an aromatic vinyl compound, and 10 to 20% by weight of a vinyl cyanide compound; the heat resistant styrene-based resin (iii) may preferably comprise 63 to 73% by weight of α-methylstyrene, 0 to 10% by weight of styrene, and 25 to 33% by weight of a vinyl cyanide compound; and the aromatic vinyl compound-vinyl cyanide compound-methacrylate copolymer (iv) may preferably comprise 65 to 85% by weight of a methacrylate-based monomer, 10 to 30% by weight of an aromatic vinyl compound, and 5 to 10% by weight of a vinyl cyanide compound.

The acrylate-aromatic vinyl compound-vinyl cyanide compound graft copolymer (i) may be preferably comprised in an amount of 1 to 20% by weight, the acrylate-aromatic vinyl compound-vinyl cyanide compound graft copolymer (ii) may be preferably comprised in an amount of 1 to 20% by weight, the heat resistant styrene-based resin (iii) may be preferably comprised in an amount of 1 to 25% by weight, and the aromatic vinyl compound-vinyl cyanide compound-methacrylate copolymer (iv) may be preferably comprised in an amount of 5 to 30% by weight.

The polyamide resin may be preferably polyamide 6, polyamide 6.6, or a mixture thereof.

In accordance with another aspect of the present invention, provided is an exterior material including the thermoplastic resin composition.

The exterior material may be preferably a siding material, a roofing material, or a decking material.

Advantageous Effects

As apparent from the foregoing, the present invention advantageously provides a low-gloss thermoplastic resin composition having excellent aesthetics, such as softness, luxuriousness, and naturalness, due to uniformity, low gloss, and improvement in surface texture while having mechanical properties and processability equal or superior to those of conventional ASA resins; and an exterior material including the low-gloss thermoplastic resin composition.

BEST MODE

Figure 1:
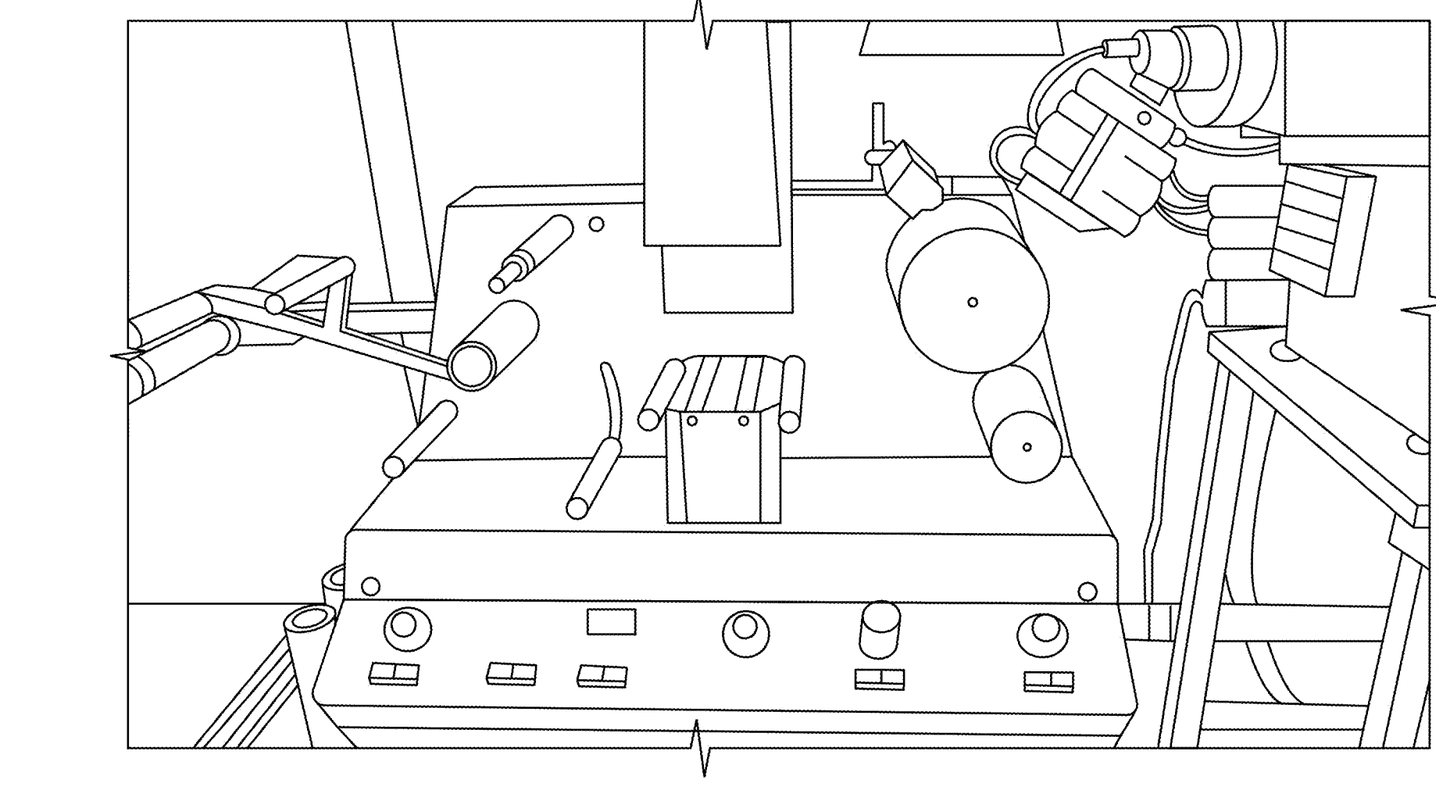
FIGURE shows a film extruder used in Examples.

Hereinafter, a thermoplastic resin composition and an exterior material including the same according to the present invention will be described in detail.

The present inventors confirmed that, as a result of their hard effort to improve the emotional quality of a low-gloss ASA resin composition including an ASA resin and a polyamide resin, when a medium-diameter ASA resin with a predetermined particle diameter was added in a predetermined amount, compared to conventional ASA resin compositions, mechanical properties, weather resistance, and processability were not deteriorated, and low gloss and natural and luxurious surface texture different from that of plastic were realized. Based on these results, the present inventors conducted further studies to complete the present invention.

The thermoplastic resin composition of the present invention includes 90 to 99.5% by weight of styrene-based resins each including 5 to 30% by weight of acrylate rubber having a DLS average particle diameter of 0.25 to 0.32 μm or a TEM average particle diameter of 0.2 to 0.27 μm based on a total weight of the styrene-based resins; and 0.5 to 10% by weight of a polyamide resin. In this case, a low-gloss thermoplastic resin composition having excellent aesthetics, such as softness, luxuriousness, and naturalness, due to uniformity, low gloss, and improvement in surface texture while having mechanical properties and processability equal or superior to those of conventional ASA-based resins; and an exterior material including the low-gloss thermoplastic resin composition may be provided.

Based on a total weight of the styrene-based resins, the acrylate rubber having a DLS average particle diameter of 0.25 to 0.32 μm or a TEM average particle diameter of 0.2 to 0.27 μm is preferably included in an amount of 10 to 25% by weight, more preferably 10 to 20% by weight, still more preferably 12 to 18% by weight, most preferably 14 to 16% by weight. Within this range, low gloss and excellent aesthetics, such as softness and luxuriousness, may be realized while satisfying mechanical properties, processability, and colorability.

Hereinafter, each component constituting the thermoplastic resin composition of the present invention will be described in detail.

<Styrene-Based Resin>

The styrene-based resin of the present invention preferably includes two or more selected from the group consisting of a first styrene-based resin, a second styrene-based resin, and a third styrene-based resin, and more preferably, include a first styrene-based resin, a second styrene-based resin, and a third styrene-based resin.

In this description, the 'styrene-based resin' follows the definition of a styrene-based resin commonly recognized in the art to which the present invention pertains and may be, for example, a resin including a unit derived from an aromatic vinyl compound.

The styrene-based resins are preferably included in an amount of 90 to 99% by weight, more preferably 90 to 97% by weight, still more preferably 90 to 65% by weight, most preferably 94 to 95% by weight. Within this range, weather resistance, aging resistance, chemical resistance, rigidity, impact resistance, and processability may be excellent.

The first styrene-based resin may be preferably an acrylate-aromatic vinyl compound-vinyl cyanide compound graft copolymer including 30 to 50% by weight of acrylate rubber having a DLS average particle diameter of 0.25 to 0.32 μm or a TEM average particle diameter of 0.2 to 0.27 μm, the second styrene-based resin may be an aromatic vinyl compound-vinyl cyanide compound copolymer, and the third styrene-based resin may include one or more selected from the group consisting of i) an acrylate-aromatic vinyl compound-vinyl cyanide compound graft copolymer including 40 to 60% by weight of acrylate rubber having a DLS average particle diameter of 0.05 to 0.2 μm or a TEM average particle diameter of 0.04 to 0.14 μm, ii) an acrylate-aromatic vinyl compound-vinyl cyanide compound graft copolymer including 40 to 60% by weight of acrylate rubber having a DLS average particle diameter of 0.33 to 0.5 μm or a TEM average particle diameter of 0.28 to 0.45 μm, iii) a heat resistant styrene-based resin, and iv) an aromatic vinyl compound-vinyl cyanide compound-methacrylate copolymer.

In addition, the styrene-based resins may preferably include 20 to 50% by weight of the first styrene-based resin, 10 to 60% by weight of the second styrene-based resin, and 1 to 30% by weight of the third styrene-based resin based on a total weight of the thermoplastic resin composition.

First Styrene-Based Resin

The first styrene-based resin of the present invention is an acrylate-aromatic vinyl compound-vinyl cyanide compound graft copolymer preferably including 30 to 50% by weight, more preferably 35 to 45% by weight, still more preferably 37 to 42% by weight of acrylate rubber having an average particle diameter of 0.25 to 0.32 μm. Within this range, mechanical properties and processability may be maintained equal or superior to those of conventional ASA-based resins, and due to uniformity, low gloss, and improvement in surface texture, aesthetics such as softness, luxuriousness, and naturalness may be excellent.

The DLS average particle diameter of the acrylate rubber is preferably 0.25 to 0.32 μm, more preferably 0.25 to 0.30 μm, still more preferably 0.26 to 0.30 μm, most preferably 0.26 to 0.29 μm. Within this range, due to uniformity, low gloss, and improvement in surface texture, aesthetics such as softness, luxuriousness, and naturalness may be excellent.

The TEM average particle diameter of the acrylate rubber is preferably 0.2 to 0.27 μm. Within this range, due to uniformity, low gloss, and improvement in surface texture, aesthetics such as softness, luxuriousness, and naturalness may be excellent.

Based on a total weight of the thermoplastic resin composition, the first styrene-based resin is preferably included in an amount of 25 to 50% by weight, more preferably 25 to 45% by weight, still more preferably 30 to 45% by weight, most preferably 30 to 42% by weight. Within this range, mechanical properties and processability may be maintained equal or superior to those of conventional ASA-based resins, and due to uniformity, low gloss, and improvement in surface texture, aesthetics such as softness, luxuriousness, and naturalness may be excellent.

The first styrene-based resin is preferably an acrylate-aromatic vinyl compound-vinyl cyanide compound graft copolymer including 30 to 50% by weight of acrylate rubber having an average particle diameter 0.25 to 0.32 μm, to 60% by weight of an aromatic vinyl compound, and 10 to 20% by weight of a vinyl cyanide compound. In this case, mechanical properties and processability may be satisfied, and due to uniformity, low gloss, and improvement in surface texture, aesthetics such as softness, luxuriousness, and naturalness may be excellent.

In this description, unless defined otherwise, the average particle diameter means a DLS average particle diameter.

Based on a total weight of the acrylate-aromatic vinyl compound-vinyl cyanide compound graft copolymer, the aromatic vinyl compound is preferably included in an amount of 40 to 55% by weight, more preferably 40 to 50% by weight, still more preferably 45 to 50% by weight. Within this range, processability and mechanical properties may be excellent.

Based on a total weight of the acrylate-aromatic vinyl compound-vinyl cyanide compound graft copolymer, the vinyl cyanide compound is preferably included in an amount of 10 to 18% by weight, more preferably 10 to 15% by weight, still more preferably 11 to 13% by weight. Within this range, processability and mechanical properties may be excellent.

Second Styrene-Based Resin

The second styrene-based resin of the present invention is preferably an aromatic vinyl compound-vinyl cyanide compound copolymer. In this case, mechanical properties and processability may be excellent.

The second styrene-based resin is preferably an aromatic vinyl compound-vinyl cyanide compound copolymer including 65 to 80% by weight of an aromatic vinyl compound and 20 to 35% by weight of a vinyl cyanide compound. Within this range, mechanical properties and processability may be excellent.

The second styrene-based resin is preferably included in an amount of 20 to 60% by weight, more preferably 30 to 60% by weight, still more preferably 40 to 60% by weight, most preferably 41 to 56% by weight. Within this range, mechanical properties and processability may be excellent.

Based on a total weight of the thermoplastic resin composition, the second styrene-based resin may preferably include a) 10 to 60% by weight of an aromatic vinyl compound-vinyl cyanide compound copolymer having a weight average molecular weight of 90,000 to 160,000 g/mol and b) 0 to 40% by weight of an aromatic vinyl compound-vinyl cyanide compound copolymer having a weight average molecular weight of greater than 160,000 g/mol and less than or equal to 200,000 g/mol. Within this range, tensile strength and impact strength may be excellent.

As a more specific example, based on a total weight of the thermoplastic resin composition, the second styrene-based resin may include 10 to 30% by weight, preferably 15 to 25% by weight of an aromatic vinyl compound-vinyl cyanide compound copolymer (a) and 25 to 45% by weight, preferably 30 to 40% by weight of an aromatic vinyl compound-vinyl cyanide compound copolymer (b). Within this range, processability, tensile strength, and impact strength may be excellent.

The aromatic vinyl compound-vinyl cyanide compound copolymer is preferably a styrene-acrylonitrile copolymer. In this case, mechanical strength and processability may be excellent.

For example, the second styrene-based resin may be prepared by suspension polymerization, emulsion polymerization, solution polymerization, or bulk polymerization. In this case, processability and fluidity may be excellent.

Suspension polymerization, emulsion polymerization, solution polymerization, and bulk polymerization commonly practiced in the art to which the present invention pertains may be used in the present invention without particular limitation.

Third Styrene-Based Resin

The third styrene-based resin of the present invention preferably includes one or more selected from the group consisting of i) an acrylate-aromatic vinyl compound-vinyl cyanide compound graft copolymer including 45 to 65% by weight of acrylate rubber having a DLS average particle diameter of 0.05 to 0.2 µm or a TEM average particle diameter of 0.04 to 0.14 µm, ii) an acrylate-aromatic vinyl compound-vinyl cyanide compound graft copolymer including 45 to 65% by weight of acrylate rubber having a DLS average particle diameter of 0.33 to 0.5 µm or a TEM average particle diameter of 0.28 to 0.45 µm, iii) a heat resistant styrene-based resin, and iv) an aromatic vinyl compound-vinyl cyanide compound-methacrylate copolymer.

Based on a total weight of the thermoplastic resin composition, the third styrene-based resin is preferably included in an amount of 1 to 20% by weight, more preferably 3 to 20% by weight, still more preferably 5 to 20% by weight. Within this range, mechanical properties, processability, heat resistance, and surface texture may be excellent.

i) Acrylate-Aromatic Vinyl Compound-Vinyl Cyanide Compound Graft Copolymer

The acrylate-aromatic vinyl compound-vinyl cyanide compound graft copolymer (i) preferably includes 45 to 65% by weight of acrylate rubber having a DLS average particle diameter of 0.05 to 0.2 µm or a TEM average particle diameter of 0.04 to 0.14 µm, 25 to 45% by weight of an aromatic vinyl compound, and 8 to 18% by weight of a vinyl cyanide compound. Within this range, weather resistance, fluidity, processability, colorability, tensile strength, and impact strength may be excellent.

As a preferred example, the acrylate-aromatic vinyl compound-vinyl cyanide compound graft copolymer (i) may include 45 to 65% by weight of acrylate rubber, 30 to 40% by weight of an aromatic vinyl compound, and 10 to 20% by weight of a vinyl cyanide compound. Within this range, weather resistance, fluidity, tensile strength, and impact strength may be excellent.

In this description, a polymer comprising a compound refers to a polymer prepared by polymerizing the compound, and a unit in the polymerized polymer is derived from the compound.

For example, the acrylate-aromatic vinyl compound-vinyl cyanide compound graft copolymer (i) may be prepared by emulsion polymerization. In this case, chemical resistance, weather resistance, fluidity, tensile strength, and impact strength may be excellent.

Emulsion polymerization commonly practiced in the art to which the present invention pertains may be used in the present invention without particular limitation.

In this description, for example, the acrylate may include one or more selected from the group consisting of alkyl acrylates containing an alkyl group having 2 to 8 carbon atoms, and is preferably an alkyl acrylate containing an alkyl group having 4 to 8 carbon atoms, more preferably butyl acrylate or ethylhexyl acrylate.

In this description, for example, the aromatic vinyl compound may include one or more selected from the group consisting of styrene, α-methylstyrene, m-methylstyrene, p-methylstyrene, and p-tert-butylstyrene, and is preferably styrene.

In this description, for example, the vinyl cyanide compound may include one or more selected from the group consisting of acrylonitrile, methacrylonitrile, ethylacrylonitrile, and isopropylacrylonitrile, and is preferably acrylonitrile.

The acrylate rubber of the graft copolymer (i) preferably has an average particle diameter of 0.05 to 0.2 µm, more preferably 0.05 to 0.15 µm, still more preferably 0.08 to 0.15 µm, most preferably 0.08 to 0.12 µm. Within this range, a thermoplastic resin composition having excellent weather resistance, colorability, impact strength, chemical resistance, and processability may be prepared.

In this description, the DSL average particle diameter may be measured by dynamic light scattering, and specifically, may be measured as an intensity value using a Nicomp 380 particle size analyzer (manufacturer: PSS) in a Gaussian mode. As a specific measurement example, a sample may be prepared by diluting 0.1 g of latex (TSC: 35 to 50 wt %) 1,000 to 5,000 times with distilled water, and DSL average particle diameter may be measured using flow cells in an auto-dilution manner and in a mode of dynamic light scattering/intensity 300 kHz/intensity-weight Gaussian analysis.

In addition, in this description, the DLS average particle diameter may be an arithmetic average particle diameter in a particle size distribution measured by dynamic light scattering, specifically, a scattering intensity average particle diameter.

In this description, the TEM average particle diameter may be measured by transmission electron microscope (TEM) analysis. Specifically, the TEM average particle diameter refers to a value obtained by numerically measuring particle size on a high magnification image of a TEM and averaging the measurement results. In this case, a specific measurement example is as follows:

Sample preparation: A thermoplastic resin or a thermoplastic resin composition is prepared using an extrusion kneader.

Sample pretreatment: Trimming (23° C.)→hydrazine treatment (72° C., 5 days)→sectioning (−120° C.)→OsO$_4$ vapor staining for 2 hours Analyzer: TEM (JEM-1400, Jeol Co.)

Analysis conditions: Acc. Volt: 120 kV, spot size: 1 (×10K, ×25K, ×50K)

Size (average particle diameter) measurement: An average diameter of particles in the top 10% of a particle diameter distribution is measured.

The acrylate-aromatic vinyl compound-vinyl cyanide compound graft copolymer (i) is preferably included in an amount of 3 to 15% by weight, more preferably 5 to 13% by weight. Within this range, weather resistance, fluidity, tensile strength, impact strength, and colorability may be excellent.

ii) Acrylate-Aromatic Vinyl Compound-Vinyl Cyanide Compound Graft Copolymer

The acrylate-aromatic vinyl compound-vinyl cyanide compound graft copolymer (ii) preferably includes 40 to 60% by weight of acrylate rubber having a DLS average particle diameter of 0.33 to 0.5 µm or a TEM average particle diameter of 0.28 to 0.45 µm, 25 to 45% by weight of an aromatic vinyl compound, and 10 to 20% by weight of a vinyl cyanide compound. Within this range, weather resistance, fluidity, tensile strength, and impact strength may be excellent.

The acrylate rubber of the graft copolymer (ii) preferably has a DLS average particle diameter of 0.35 to 0.5 µm, more preferably 0.35 to 0.45 µm, still more preferably 0.38 to 0.45 µm, most preferably 0.38 to 0.42 µm. Within this range, weather resistance may be good, and fluidity and mechanical strength, such as tensile strength and impact strength, may be excellent.

As a preferred example, the graft copolymer (ii) may include 45 to 55% by weight of acrylate rubber, 30 to 40% by weight of an aromatic vinyl compound, and 10 to 20% by weight of a vinyl cyanide compound. Within this range, weather resistance, fluidity, tensile strength, and impact strength may be excellent.

The acrylate-aromatic vinyl compound-vinyl cyanide compound graft copolymer (ii) is preferably included in an amount of 5 to 15% by weight, more preferably 10 to 15% by weight. Within this range, weather resistance, fluidity, tensile strength, and impact strength may be excellent.

For example, the graft copolymer (ii) may be prepared by emulsion polymerization. In this case, weather resistance, fluidity, tensile strength, and impact strength may be excellent.

Emulsion polymerization commonly practiced in the art to which the present invention pertains may be used in the present invention without particular limitation.

iii) Heat Resistant Styrene-Based Resin

The heat resistant styrene-based resin (iii) is preferably an α-methylstyrene-vinyl cyanide compound copolymer. In this case, mechanical properties and heat resistance may be excellent.

The heat resistant styrene-based resin (iii) preferably includes 63 to 73% by weight of α-methylstyrene, 0 to 10% by weight of styrene, and 25 to 33% by weight of a vinyl cyanide compound. Within this range, mechanical properties, and heat resistance may be excellent.

The heat resistant styrene-based resin (iii) is preferably included in an amount of 1 to 20% by weight, more preferably 5 to 17% by weight, still more preferably 5 to 15% by weight. Within this range, mechanical properties and heat resistance may be excellent.

The alpha-methylstyrene-acrylonitrile copolymer preferably includes 70 to 75% by weight of alpha-methylstyrene and 25 to 30% by weight of acrylonitrile, more preferably 60 to 75% by weight of alpha-methylstyrene, 0 to 10% by weight of styrene, and 20 to 30% by weight of acrylonitrile, or may include 65 to 75% by weight of alpha-methylstyrene, 0 to 10% by weight of styrene, and 25 to 30% by weight of acrylonitrile, still more preferably 60 to 75% by weight of alpha-methylstyrene, 5 to 10% by weight of styrene, and 20 to 30% by weight of acrylonitrile, or may include 60 to 70% by weight of alpha-methylstyrene, 5 to 10% by weight of styrene, and 25 to 30% by weight of acrylonitrile. Within this range, heat resistance may be excellent.

The alpha-methylstyrene-acrylonitrile copolymer preferably has a weight average molecular weight of 80,000 to 120,000 g/mol, more preferably 80,000 to 100,000 g/mol. Within this range, mechanical properties and heat resistance may be excellent.

In this description, unless otherwise defined, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. As a specific measurement example, the weight average molecular weight may be measured under conditions of solvent: THF, column temperature: 40° C., flow rate: 0.3 ml/min, sample concentration: 20 mg/ml, injection amount: 5 µl, column model: 1× PLgel 10 µm MiniMix-B (250×4.6 mm)+ 1× PLgel 10 µm MiniMix-B (250×4.6 mm)+1× PLgel 10 µm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, the heat resistant styrene-based resin (iii) may be prepared by suspension polymerization, emulsion polymerization, solution polymerization, or bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limitation.

iv) Aromatic Vinyl Compound-Vinyl Cyanide Compound-Methacrylate Copolymer

The aromatic vinyl compound-vinyl cyanide compound-methacrylate copolymer (iv) preferably includes 65 to 85% by weight of a methacrylate-based monomer, 10 to 30% by weight of an aromatic vinyl compound, and 5 to 10% by weight of a vinyl cyanide compound. Within this range, weather resistance, mechanical properties, colorability, and processability may be excellent.

The aromatic vinyl compound-vinyl cyanide compound-methacrylate copolymer (iv) is preferably included in an amount of 10 to 25% by weight, more preferably 10 to 20% by weight, still more preferably 12 to 18% by weight. Within this range, weather resistance, mechanical properties, colorability, and processability may be excellent.

In this description, for example, the methacrylate monomer may be an alkyl methacrylate containing an alkyl group having 1 to 15 carbon atoms. As a specific example, the methacrylate monomer may include one or more selected from the group consisting of methyl methacrylate, ethyl methacrylate, butyl methacrylate, 2-ethylbutyl methacrylate, 2-ethylhexyl methacrylate, and lauryl methacrylate, and is preferably an alkyl methacrylate containing a chain alkyl group having 1 to 4 carbon atoms, more preferably methyl methacrylate.

The aromatic vinyl compound-vinyl cyanide compound-methacrylate copolymer (iv) preferably has a weight average molecular weight of 70,000 to 200,000 g/mol or 70,000 to 190,000 g/mol, more preferably 100,000 to 150,000 g/mol, still more preferably 120,000 to 140,000 g/mol. Within this range, weather resistance, fluidity, tensile strength, and impact strength may be excellent.

For example, the aromatic vinyl compound-vinyl cyanide compound-methacrylate copolymer (iv) may be prepared by solution polymerization, bulk polymerization, emulsion polymerization, or suspension polymerization, preferably solution polymerization or bulk polymerization. Solution polymerization, bulk polymerization, emulsion polymerization, and suspension polymerization commonly practiced in the art to which the present invention pertains may be used in the present invention without particular limitation.

Polyamide Resin

The polyamide is a thermoplastic polymer including amide bonds. As a specific example, the polyamide may include one or more selected from the group consisting of polyamide 6, polyamide 66 (PA 6.6), polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I, and is preferably polyamide 6, polyamide 6.6, or a mixture thereof, more preferably polyamide 66 (PA 6.6).

The polyamide resin is preferably included in an amount of 1 to 10% by weight, more preferably 3 to 10% by weight, still more preferably 5 to 10% by weight, most preferably 5 to 6% by weight. Within this range, low gloss may be implemented, thereby increasing matte effect. In addition, physical property balance may be excellent.

For example, the polyamide may have a melting point of 230° C. or more, preferably 240° C. or more, more preferably 250° C. or more, still more preferably 260 to 270° C.

For example, the polyamide may have a relative viscosity (96% sulfuric acid solution) of 2.0 to 4.0, preferably 2.0 to 3.5, more preferably 2.0 to 3.0, still more preferably 2.4 to 2.7.

In this description, the relative viscosity may be measured using an Ubbelohde viscometer by a sulfuric acid method according to ISO 307.

Polymerization methods commonly practiced in the art to which the present invention pertains may be used to prepare the polyamide. In addition, commercially available polyamides may be used when the polyamides conform to the definition of the polyamide according to the present invention.

Thermoplastic Resin Composition

The thermoplastic resin composition of the present invention preferably has a reduced volume of 15 to 40, more preferably 18 to 40, still more preferably 20 to 35, still more preferably 20 to 30. Within this range, an exterior material having excellent aesthetics, such as softness, luxuriousness, and naturalness, due to uniformity, low gloss, and improvement in surface texture while having mechanical properties and processability equal or superior to those of conventional ASA-based resins may be provided.

For example, the thermoplastic resin composition may include 0.1 to 5 parts by weight, preferably 0.1 to 2 parts by weight, more preferably 0.1 to 1 part by weight, still more preferably 0.3 to 0.6 parts by weight of an inorganic pigment based on 100 parts by weight in total of the thermoplastic resin composition. Within this range, weather resistance and hiding power may be excellent.

For example, the inorganic pigment may include one or more selected from the group consisting of metal compounds including Ti, Pb, Fe, Cr, etc, and carbon black. The metal compounds are preferably metal oxides or metal hydroxides. As a specific example, the inorganic pigment may include one or more selected from the group consisting of $TiO_2$ and zinc oxide as white inorganic pigments; carbon black and graphite as black inorganic pigments; IOR, cadmium red, and red lead ($Pb_3O_4$) as red inorganic pigments; chrome yellow, zinc chromate, and cadmium yellow as yellow inorganic pigments; and chrome green and zinc green as green inorganic pigments, and most preferably, is $TiO_2$, which is a white inorganic pigment.

The thermoplastic resin composition preferably has an average surface roughness (Ra) of 2.2 or less, more preferably 2.1 or less, as a preferred example, 1.9 to 2.2, as a more preferred example, 1.9 to 2.1, as measured at 5 points using an optical profiler system. Within this range, softness, luxuriousness, and naturalness may be improved.

The thermoplastic resin composition is preferably a matte thermoplastic resin composition having a film gloss of or less as measured at 60° using a gloss meter VG7000. More preferably, the thermoplastic resin composition is a matte thermoplastic resin composition having a film gloss of or less, still more preferably 7 or less. Within this range, matte properties and physical property balance may be excellent. Thus, the thermoplastic resin composition of the present invention may be referred to as a matte thermoplastic resin composition.

For example, the thermoplastic resin composition may have a weather resistance ($\Delta E$) of 5.0 or less, preferably 4.9 or less, more preferably 4.0 or less, still more preferably 3.5 or less as measured for 2,000 hours according to SAE J1960.

For example, the thermoplastic resin composition may have a melt index (MI) (220° C., load: 10 kg) of 4 g/10 min or more, preferably 5 g/10 min or more, more preferably 6 g/10 min or more, still more preferably 9 g/10 min or more, as a specific example, 4 to 15 g/10 min, as measured according to ASTM D1238.

For example, the thermoplastic resin composition may have a tensile strength (⅛ inch) of 350 kg/cm² or more, preferably 380 kg/cm² or more, more preferably 450 kg/cm² or more, still more preferably 470 kg/cm² or more, as a specific example, 380 to 490 kg/cm², as measured according to ASTM 638.

For example, the thermoplastic resin composition may have an Izod impact strength (¼ inch) of 6 kg·cm/cm or more, preferably 7 kg·cm/cm or more, as a specific example, 6 to 11 kg·cm/cm, as measured according to ASTM 256.

When necessary, the thermoplastic resin composition may further include 0.01 to 5 parts by weight, 0.05 to 3 parts by weight, 0.1 to 2 parts by weight, or 0.5 to 1 part by weight of one or more selected from the group consisting of a heat stabilizer, a light stabilizer, a dye, a colorant, a release agent, an antistatic agent, an antibacterial agent, a processing aid, a metal deactivator, a flame retardant, a smoke suppressant, an anti-drip agent, an anti-friction agent, and an anti-wear agent. Within this range, the required physical properties of the thermoplastic resin composition of the present invention may be implemented without deterioration in the intrinsic physical properties thereof.

For example, a method of preparing the thermoplastic resin composition of the present invention may comprise a step of mixing 90 to 99.5% by weight of styrene-based resins each including 5 to 30% by weight of acrylate rubber having a DLS average particle diameter of 0.25 to 0.32 μm or a TEM average particle diameter of 0.2 to 0.27 μm based on a total weight of the styrene-based resins; and 0.5 to 10% by weight of a polyamide resin and preparing pellets under 220 to 280° C. using an extrusion kneader. In this case, mechanical properties and processability may be maintained to be equal or superior to those of conventional ASA-based resins, and excellent weather resistance and surface gloss, low gloss, and low surface roughness value may be realized, thereby providing a thermoplastic resin composition having a soft feel.

The method of preparing the thermoplastic resin composition shares all the technical characteristics of the above-described thermoplastic resin composition. Accordingly, repeated description thereof will be omitted.

The step of preparing pellets using an extrusion kneader is preferably performed at temperature higher than the Tm of nylon. Thus, as a specific example, the step of preparing pellets is preferably performed at 220 to 280° C., more preferably 250 to 280° C. In this case, the temperature is the temperature of a cylinder.

Extrusion kneaders commonly used in the art to which the present invention pertains may be used without particular limitation, and a twin-screw extrusion kneader is preferably used.

Exterior Material

An exterior material of the present invention includes the thermoplastic resin composition of the present invention. In this case, the exterior material may have mechanical properties and processability equal or superior to those of conventional ASA resins, and may have excellent aesthetics, such as softness, luxuriousness, and naturalness, due to uniformity, low gloss, and improvement in surface texture.

For example, the exterior material may be an extrusion-molded article or an injection-molded article, preferably a siding material, a roofing material, or a decking material, more preferably a sliding door or a window.

The exterior material is preferably prepared by extruding or injecting the thermoplastic resin composition of the present invention at a molding temperature of 190 to 250° C., preferably 210 to 240° C. Within this range, a matte effect may be imparted to a product.

In the description of the thermoplastic resin composition of the present invention, the method of preparing the same, and the exterior material including the same, other conditions or equipment that are not explicitly described may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 8 and Comparative Examples 1 to 5 are as follows.

A-1) Graft copolymer prepared by emulsion polymerization (40% by weight of a butylacrylate polymer-derived unit having an average particle diameter of 280 nm, 48% by weight of a styrene-derived unit, and 12% by weight of an acrylonitrile-derived unit)

A-2) Graft copolymer prepared by emulsion polymerization (50% by weight of a butylacrylate polymer-derived unit having an average particle diameter of 100 nm, 36% by weight of a styrene-derived unit, and 14% by weight of an acrylonitrile-derived unit)

A-3) Graft copolymer prepared by emulsion polymerization (50% by weight of a butylacrylate polymer-derived unit having an average particle diameter of 400 nm, 37% by weight of a styrene-derived unit, and 13% by weight of an acrylonitrile-derived unit)

B-1) SAN resin prepared by bulk polymerization (90RF)

B-2) SAN resin prepared by bulk polymerization (97HC)

B-3) SAN resin prepared by bulk polymerization (200UH)

C) SAMMA resin prepared by bulk polymerization (XT500)

D) PA 6.6

Examples 1 to 8 and Comparative Examples 1 to 5

According to the components and contents shown in Table 1 below, pellets were prepared at 280° C. using a 36 pi extrusion kneader, a film with a uniform thickness of 0.15 T was prepared from the pellets using a film extruder, and the physical properties of the prepared film were measured according to the following measurement methods. At this time, a single-screw extruder for sheet molding (model: E20T, 20 pi, L/D: 25, Collin Co.) was used as the film extruder, and temperature conditions were set as follows: barrel temperatures of 50, 200, 210, and 210° C. and die temperatures of 220, 220, and 230° C. in order from the inlet of the extruder. The pellets were sufficiently dried in an oven at 80° C. for 3 hours or more to eliminate the effect of moisture, and then were fed into the film extruder through the inlet of the film extruder to prepare a film with a uniform thickness of 0.15 T. The temperature of a rear roller was set to 85° C. using water as a medium, and as shown in the FIGURE, the roller was configured such that only one side of a resin extruded through a T-die was in contact with a roll. At this time, the screw RPM of the film extruder was fixed at 100, and the linear velocity of the roll was adjusted so that the film had a thickness of 0.15 T. At this time, the surface roughness value (Ra) and the film gloss of a surface in contact with the first roll among extruded film surfaces were measured. For reference, when measuring with a surface not in contact with the first roll, a difference may occur in surface roughness.

In addition, the prepared pellets were injected at a molding temperature of 220° C. to prepare a specimen for measuring physical properties, and the tensile strength and impact strength of the specimen were measured.

Test Examples

The properties of pellets, sheets, and specimens prepared in Examples 1 to 8 and Comparative Examples 1 to 5 were measured according to the following methods, and the results are shown in Table 1 below.

Melt index (MI): Melt index was measured using the prepared pellets under conditions of 220° C./10 kg according to ASTM D1238.

Tensile strength (kg/cm$^2$): Tensile strength was measured according to ASTM 638.

Izod impact strength (kg·cm/cm): Izod impact strength was measured using a ¼" thick specimen according to ASTM 256.

Film gloss: Film gloss was measured at 60° using a gloss meter VG7000.

Reduced volume: Reduced volume is measured using Equation 1 below.

$$\text{Reduced volume} = [1/6\Pi(R_A)^3(A/A+B+C) + 1/6\Pi(R_B)^3(B/A+B+C) + 1/6\Pi(R_C)^3(C/A+B+C)]/[1/6(R_C)^3], \quad \text{[Equation 1]}$$

In Equation 1, R A represents an average particle diameter (nm) of a rubber having the largest average particle diameter among rubbers included in a resin composition, $R_B$ represents an average particle diameter (nm) of a rubber having a medium average particle diameter among rubbers included in a resin composition, R c represents an average particle diameter (nm) of a rubber having the smallest average particle diameter among rubbers included in a resin composition, A represents a content (% by weight) of a graft polymer having the largest average particle diameter among rubbers included in a resin composition, B represents a content (% by weight) of a graft polymer having a medium average particle diameter among rubbers included in a resin composition, and C represents a content (% by weight) of a graft polymer having the smallest average particle diameter among rubbers included in a resin composition. In addition, when rubber having a medium average particle diameter is not included in the resin composition of the present invention, B is "0".

Surface roughness value (Ra): Surface roughness values for 5 points were measured using an optical profiler system (NV-2700, Nano System Co., Ltd.) (objective lens (10×)×ocular lens (1×) (F.O.V: 628 μm×471 μm), model: WSI Envelope, and scan range: ±30 μm), and an average value for the measured surface roughness values was calculated. When the surface roughness value is low, the texture is felt smoothly in being touched by hand and gloss is even.

Weather resistance: Measurement was performed for 2,000 hours according to SAE J1960, and ΔE was calculated using Equation 2 below. Based on the obtained ΔE value, weather resistance was evaluated. As the ΔE value decreases, weather resistance increases.

$$\Delta E = \sqrt{\{(L-L')^2 + (a-a')^2 + (b-b')^2\}} \qquad [\text{Equation 2}]$$

(√: square root sign)

TABLE 1

| Parts by weights | Examples | | | | | | | | Comparative Examples | | | | |
|---|---|---|---|---|---|---|---|---|---|---|---|---|---|
| | 1 | 2 | 3 | 4 | 5 | 6 | 7 | 8 | 1 | 2 | 3 | 4 | 5 |
| A-1 | 38 | 38 | 33 | 33 | 30 | 40 | 39 | 30 | | | | | |
| A-2 | | | 5 | 5 | | 14 | | | 13 | 13 | 8 | 38 | |
| A-3 | | | | | 8 | | | 8 | 25 | 25 | 30 | | 38 |
| B-1 | 41 | 51 | 41 | 20 | 20 | 41 | 50 | 15 | 41 | 41 | 51 | 41 | 41 |
| B-2 | | | | 36 | 36 | | | 41 | | | | | |
| B-3 | | 5 | 15 | | | | 5 | | 15 | | 5 | 15 | 15 |
| C | 15 | | | | | | | | 15 | | | | |
| B-4 | | | | | | | | | | | | | |
| D | 6 | 6 | 6 | 6 | 6 | 5 | 6 | 6 | 6 | 6 | 6 | 6 | 6 |
| $TiO_2$ pigment | 0.60 | 0.60 | 0.60 | 0.60 | 0.60 | 0.60 | 0.6 | 0.6 | 0.60 | 0.60 | 0.60 | 0.60 | 0.60 |
| Melt index | 9.6 | 11.3 | 9.0 | 6.3 | 5.9 | 4.3 | 9.9 | 5.6 | 7.9 | 9.2 | 9.9 | 9.50 | 7.7 |
| Tensile strength | 469 | 487 | 479 | 487 | 477 | 385 | 474 | 479 | 442 | 444 | 450 | 532 | 438 |
| Impact strength | 6.71 | 6.21 | 6.74 | 7.53 | 8.61 | 10.1 | 6.6 | 8.96 | 7.11 | 6.48 | 6.45 | 2.81 | 7.4 |
| Film Gloss | 5.7 | 5.7 | 4.6 | 6.4 | 5.8 | 7 | 6.9 | 5.6 | 4.3 | 4.7 | 5.1 | 6.1 | 4.7 |
| Surface roughness | 1.96 | 1.91 | 2.09 | 2.03 | 2.13 | 1.90 | 1.48 | 2.04 | 2.82 | 2.81 | 2.94 | 2.32 | 3.93 |
| Reduced volume | 22 | 22 | 19.2 | 19.2 | 30.8 | 16.5 | 22 | 30.8 | 42.4 | 42.4 | 50.7 | 1.0 | 64 |

As shown in Table 1, it can be confirmed that the thermoplastic resin compositions (see Examples 1 to 8) according to the present invention have excellent weather resistance, low surface roughness values, and reduced volumes suitable for aesthetics while maintaining mechanical properties, such as melt index, tensile strength, and impact strength, to be equal or superior to those of Comparative Examples 1 to 5 not including the medium-diameter acrylate-aromatic vinyl compound-vinyl cyanide compound graft copolymer of the present invention, which is the first styrene-based polymer. Due to these features, the composition of the present invention is natural and soft, and gives a luxurious feel.

In addition, in the case of Comparative Example 4, which does not follow the present invention, roughness value is somewhat low, but impact strength is very poor. Thus, Comparative Example 4 does not meet the purpose of the present invention.

The invention claimed is:

1. A thermoplastic resin composition, comprising:
    90 to 99.5% by weight of a styrene-based resin comprising 5 to 30% by weight of acrylate rubber having a DLS average particle diameter of 0.25 to 0.32 μm or a TEM average particle diameter of 0.2 to 0.27 μm based on a total weight of the styrene-based resin; and
    0.5 to 10% by weight of a polyamide resin,
    wherein the styrene-based resin comprises two or more selected from the group consisting of a first styrene-based resin, a second styrene-based resin, and a third styrene-based resin,
    wherein the first styrene-based resin includes an acrylate-aromatic vinyl compound-vinyl cyanide compound graft copolymer comprising 30 to 50% by weight of the acrylate rubber having the DLS average particle diameter of 0.25 to 0.32 μm,
    wherein the second styrene-based resin includes an aromatic vinyl compound-vinyl cyanide compound copolymer,
    wherein the third styrene-based resin comprises one or more selected from the group consisting of:
        i) an acrylate-aromatic vinyl compound-vinyl cyanide compound graft copolymer comprising 45 to 65% by weight of acrylate rubber having a DLS average particle diameter of 0.05 to 0.2 μm or a TEM average particle diameter of 0.04 to 0.14 μm,
        ii) an acrylate-aromatic vinyl compound-vinyl cyanide compound graft copolymer comprising 45 to 65% by weight of acrylate rubber having a DLS average particle diameter of 0.33 to 0.5 μm or a TEM average particle diameter of 0.28 to 0.45 μm,
        iii) a heat resistant styrene-based resin, and
        iv) a methacrylate-aromatic vinyl compound-vinyl cyanide compound copolymer,
    wherein the acrylate-aromatic vinyl compound-vinyl cyanide compound graft copolymer (i) comprises:
        45 to 65% by weight of the acrylate rubber having the DLS average particle diameter of 0.05 to 0.2 μm or the TEM average particle diameter of 0.04 to 0.14 μm,
        25 to 45% by weight of a first aromatic vinyl compound, and
        8 to 18% by weight of a first vinyl cyanide compound;
    wherein the acrylate-aromatic vinyl compound-vinyl cyanide compound graft copolymer (ii) comprises:
        45 to 65% by weight of the acrylate rubber having the DLS average particle diameter of 0.33 to 0.5 μm or the TEM average particle diameter of 0.28 to 0.45 μm,
        25 to 45% by weight of a second aromatic vinyl compound, and
        8 to 18% by weight of a second vinyl cyanide compound;
    wherein the heat resistant styrene-based resin (iii) comprises:
        63 to 73% by weight of a-methylstyrene,
        0 to 10% by weight of styrene, and
        25 to 33% by weight of a third vinyl cyanide compound; and
    wherein the methacrylate-aromatic vinyl compound-vinyl cyanide compound copolymer (iv) comprises:
        60 to 80% by weight of a methacrylate-based monomer,
        10 to 30% by weight of a third aromatic vinyl compound, and
        5 to 10% by weight of a fourth vinyl cyanide compound.

2. The thermoplastic resin composition according to claim 1, wherein the styrene-based resin comprises
    20 to 50% by weight of the first styrene-based resin,
    10 to 60% by weight of the second styrene-based resin, and
    1 to 30% by weight of the third styrene-based resin based on a total weight of the thermoplastic resin composition.

3. The thermoplastic resin composition according to claim 1, further comprising 0.1 to 5 parts by weight of an inorganic pigment based on 100 parts by weight in total of the thermoplastic resin composition.

4. The thermoplastic resin composition according to claim 1, wherein the thermoplastic resin composition is a matte thermoplastic resin composition having a film gloss of 15 or less.

5. The thermoplastic resin composition according to claim 1, wherein the first styrene-based resin includes an acrylate-aromatic vinyl compound-vinyl cyanide compound graft copolymer comprising
    30 to 50% by weight of the acrylate rubber having the DLS average particle diameter of 0.25 to 0.32 μm or a TEM average particle diameter of 0.2 to 0.27 μm,
    40 to 60% by weight of an aromatic vinyl compound, and
    8 to 18% by weight of a vinyl cyanide compound.

6. The thermoplastic resin composition according to claim 1, wherein the second styrene-based resin includes an aromatic vinyl compound-vinyl cyanide compound copolymer comprising
    65 to 80% by weight of an aromatic vinyl compound and
    20 to 35% by weight of a vinyl cyanide compound.

7. The thermoplastic resin composition according to claim 1, wherein, based on a total weight of the thermoplastic resin composition, the second styrene-based resin comprises
    a) 10 to 60% by weight of an aromatic vinyl compound-vinyl cyanide compound copolymer having a weight average molecular weight of 90,000 to 150,000 g/mol and
    b) 0 to 40% by weight of an aromatic vinyl compound-vinyl cyanide compound copolymer having a weight average molecular weight of greater than 150,000 g/mol and less than or equal to 200,000 g/mol.

8. The thermoplastic resin composition according to claim 1, wherein
the acrylate-aromatic vinyl compound-vinyl cyanide compound graft copolymer (i) is present in an amount of 1 to 20% by weight,
the acrylate-aromatic vinyl compound-vinyl cyanide compound graft copolymer (ii) is present in an amount of 1 to 20% by weight,
the heat resistant styrene-based resin (iii) is present in an amount of 1 to 25% by weight, and
the methacrylate-aromatic vinyl compound-vinyl cyanide compound copolymer (iv) is present in an amount of 5 to 30% by weight.

9. The thermoplastic resin composition according to claim 1, wherein the polyamide resin comprises one or more selected from the group consisting of polyamide 6, polyamide 66 (PA 6.6), polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide Jun. 12, 1991, and polyamide 66/12/6I.

10. An exterior material, comprising the thermoplastic resin composition according to claim 1.

11. The exterior material according to claim 10, wherein the exterior material is a siding material, a roofing material, or a decking material.

12. A thermoplastic resin composition, comprising:
90 to 99.5% by weight of a styrene-based resin comprising 5 to 30% by weight of acrylate rubber having a DLS average particle diameter of 0.25 to 0.32 μm or a TEM average particle diameter of 0.2 to 0.27 μm based on a total weight of the styrene-based resin; and
0.5 to 10% by weight of a polyamide resin,
wherein the styrene-based resin comprises two or more selected from the group consisting of a first styrene-based resin, a second styrene-based resin, and a third styrene-based resin,
the first styrene-based resin comprises an acrylate-aromatic vinyl compound-vinyl cyanide compound graft copolymer comprising:
30 to 50% by weight of the acrylate rubber having the DLS average particle diameter of 0.25 to 0.32 μm or a TEM average particle diameter of 0.2 to 0.27 μm,
40 to 60% by weight of an aromatic vinyl compound, and
8 to 18% by weight of a vinyl cyanide compound,
wherein the second styrene-based resin includes an aromatic vinyl compound-vinyl cyanide compound copolymer, and
wherein the third styrene-based resin comprises one or more selected from the group consisting of:
i) an acrylate-aromatic vinyl compound-vinyl cyanide compound graft copolymer comprising 45 to 65% by weight of acrylate rubber having a DLS average particle diameter of 0.05 to 0.2 μm or a TEM average particle diameter of 0.04 to 0.14 μm,
ii) an acrylate-aromatic vinyl compound-vinyl cyanide compound graft copolymer comprising 45 to 65% by weight of acrylate rubber having a DLS average particle diameter of 0.33 to 0.5 μm or a TEM average particle diameter of 0.28 to 0.45 μm,
iii) a heat resistant styrene-based resin, and
iv) a methacrylate-aromatic vinyl compound-vinyl cyanide compound copolymer.

13. A thermoplastic resin composition, comprising:
90 to 99.5% by weight of a styrene-based resin comprising 5 to 30% by weight of acrylate rubber having a DLS average particle diameter of 0.25 to 0.32 μm or a TEM average particle diameter of 0.2 to 0.27 μm based on a total weight of the styrene-based resin; and
0.5 to 10% by weight of a polyamide resin,
wherein the styrene-based resin comprises two or more selected from the group consisting of a first styrene-based resin, a second styrene-based resin, and a third styrene-based resin,
wherein the first styrene-based resin includes an acrylate-aromatic vinyl compound-vinyl cyanide compound graft copolymer comprising 30 to 50% by weight of the acrylate rubber having the DLS average particle diameter of 0.25 to 0.32 μm,
wherein the second styrene-based resin includes an aromatic vinyl compound-vinyl cyanide compound copolymer,
wherein the third styrene-based resin comprises one or more selected from the group consisting of:
i) 1 to 20% by weight of an acrylate-aromatic vinyl compound-vinyl cyanide compound graft copolymer comprising 45 to 65% by weight of acrylate rubber having a DLS average particle diameter of 0.05 to 0.2 μm or a TEM average particle diameter of 0.04 to 0.14 μm,
ii) 1 to 20% by weight of an acrylate-aromatic vinyl compound-vinyl cyanide compound graft copolymer comprising 45 to 65% by weight of acrylate rubber having a DLS average particle diameter of 0.33 to 0.5 μm or a TEM average particle diameter of 0.28 to 0.45 μm,
iii) 1 to 25% by weight of a heat resistant styrene-based resin, and
iv) 5 to 30% by weight of a methacrylate-aromatic vinyl compound-vinyl cyanide compound copolymer.

* * * * *